(12) United States Patent
Jayapalan

(10) Patent No.: US 12,487,303 B2
(45) Date of Patent: Dec. 2, 2025

(54) MAGNETIC RESONANCE IMAGING SYSTEM GENERATING ANTI-NOISE

(71) Applicant: KONINKLIJKE PHILIPS N.V., Eindhoven (NL)

(72) Inventor: Manivannan Jayapalan, Bangalore (IN)

(73) Assignee: Koninklijke Philips N.V., Eindhoven (NL)

( * ) Notice: Subject to any disclaimer, the term of this patent is extended or adjusted under 35 U.S.C. 154(b) by 139 days.

(21) Appl. No.: 18/291,597

(22) PCT Filed: Jul. 15, 2022

(86) PCT No.: PCT/EP2022/069927
§ 371 (c)(1),
(2) Date: Jan. 24, 2024

(87) PCT Pub. No.: WO2023/006456
PCT Pub. Date: Feb. 2, 2023

(65) Prior Publication Data
US 2025/0085369 A1    Mar. 13, 2025

(30) Foreign Application Priority Data
Jul. 26, 2021  (EP) .................................... 21187716

(51) Int. Cl.
*G01V 3/00*        (2006.01)
*G01R 33/385*      (2006.01)
(Continued)

(52) U.S. Cl.
CPC ....... *G01R 33/3854* (2013.01); *G01R 33/543* (2013.01); *G10K 11/17821* (2018.01);
(Continued)

(58) Field of Classification Search
CPC .............. G01R 33/3854; G01R 33/543; G10K 11/17821
(Continued)

(56) References Cited

U.S. PATENT DOCUMENTS

| 7,239,140 B1 | 7/2007 | Maier et al. |
| 2017/0192068 A1 | 7/2017 | Taniguchi et al. |

(Continued)

FOREIGN PATENT DOCUMENTS

| CN | 110222843 A | 9/2019 |
| DE | 102013219309 A1 | 3/2015 |

OTHER PUBLICATIONS

International Search Report and Written Opinion from PCT/EP2022/069927 mailed Nov. 9, 2022.
(Continued)

*Primary Examiner* — Walter L Lindsay, Jr.
*Assistant Examiner* — Frederick Wenderoth

(57) ABSTRACT

Disclosed herein is a magnetic resonance imaging system (100) controlled by a processor (130). Execution of machine executable instructions causes the processor to receive a selection input of gradient coil pulse commands, to provide the selected commands and at least one value relating to a further parameter to a trained machine learning system (122), to receive from the machine learning system information as to anti-noise to be generated by a sound transducer (124, 129) to compensate for noise experienced at the ears of a subject (118) in the magnetic resonance imaging system. The machine executable instructions further cause the processor to control the magnetic resonance imaging system with the pulse sequence commands and the set of gradient coil pulse commands for acquisition of the imaging k-space data and to synchronized therewith operate the sound trans-
(Continued)

ducer for generating anti-noise using the information as output by the trained machine learning system.

15 Claims, 13 Drawing Sheets

(51) Int. Cl.
  *G01R 33/54*    (2006.01)
  *G10K 11/178*    (2006.01)

(52) U.S. Cl.
  CPC ............... *G10K 2210/1161* (2013.01); *G10K 2210/3038* (2013.01); *G10K 2210/3047* (2013.01)

(58) Field of Classification Search
  USPC ......................................... 324/318
  See application file for complete search history.

(56) References Cited

U.S. PATENT DOCUMENTS

| | | |
|---|---|---|
| 2017/0209069 A1 | 7/2017 | Lee et al. |
| 2018/0024215 A1* | 1/2018 | Zhu ................. G01R 33/543 324/309 |
| 2021/0161498 A1 | 6/2021 | Hu |

OTHER PUBLICATIONS

Mingfeng Li, Ph.D., Teik C. Lim, Ph. D., and Jing-Huei Lee, Ph.D., * Simulation Study on Active Noise Control for a 4 Tesla MRI Scanner, Magn Reson Imaging. Apr. 2008 ; 26(3): 393-400.

Jezzard P, Clare S. Sources of distortion in functional MRI data. Hum Brain Mapp 1999;8:80-85.

M. S. Takkar, M. Kumar Sharma and R. Pal, "A review on evolution of acoustic noise reduction in MRI," 2017 Recent Developments in Control, Automation & Power Engineering (RDCAPE), Noida, 2017, pp. 235-240. doi: 10.1109/.2017.8358273.

I. Juvanna and Uppu Ramachandraiah, Acoustic Noise Reduction in MRI—A Review, Indian Journal of Science and Technology, vol. 9(39), DOI: 10.17485/ijst/2016/v9i39/100791, Oct. 2016.

C. K. Chen, Tzi-Dar Chiueh and Jyh-Horng Chen, "Active cancellation system of acoustic noise in MR imaging," in IEEE Transactions on Biomedical Engineering, vol. 46, No. 2, pp. 186-191, Feb. 1999.

* cited by examiner

MAGNETIC RESONANCE IMAGING SYSTEM GENERATING ANTI-NOISE

CROSS REFERENCE TO RELATED APPLICATIONS

This application is a U.S. national phase application of International Application No. PCT/EP2022/069927 file on Jul. 15, 2022, which claims the benefit of EP application Ser. No. 21/187,716.2 filed on Jul. 26, 2021 and is incorporated herein by reference.

FIELD OF THE INVENTION

The invention relates to Magnetic Resonance Imaging, in particular to a magnetic resonance imaging system that generates anti-noise by means of a sound transducer to compensate for noise experienced at the ears of a subject present in the magnetic resonance imaging system, the noise resulting from operation of the magnetic resonance imaging system.

BACKGROUND OF THE INVENTION

A large static magnetic field is used by Magnetic Resonance Imaging (MRI) scanners to align the nuclear spins of atoms as part of the procedure for producing images within the body of a subject. This large static magnetic field is referred to as the B0 field or the main magnetic field. For spatial encoding, a magnetic field gradient coil system is used to superimpose time dependent gradient magnetic fields on the B0 field. The gradient magnetic fields are generated by supplying magnetic gradient coils with electrical current. Changes in the electrical current generally result in loud repetitive audible noises during a magnetic resonance imaging examination.

From, DE 10 2013 219 309 A1, a method it is known to suppress such noise in a magnetic resonance imaging system. Anti-noise signal is played for a subject present in the bore of the magnetic resonance imaging system, e.g., to control using headphones worn by the patient. Namely, predetermined anti-noise patterns are used that are stored in a memory, for instance in an audio format.

The anti-noise is intended to represent the inverted real noise. The patterns are obtained as a result of a prior measurement of the real noise in the bore in dependence of the sequences used for supplying the magnetic gradient coils of the magnetic resonance imaging system with electrical current, and the closest suitable patterns are later selected in conjunction with a selection of such sequences.

SUMMARY OF THE INVENTION

The invention provides for a method of generating anti-noise in a first magnetic resonance imaging system, a magnetic resonance imaging system, and a computer program in the independent claims. Embodiments are given in the dependent claims.

During a magnetic resonance imaging scan, large noises generated by the gradient coil system can startle a subject causing subject movement. This can lead to artifacts and blurring in the resulting magnetic resonance image. Moreover, the subject may feel uncomfortable due to this large noise and the earplugs or mufflers that they were wearing during scan. To help reduce or eliminate this, embodiments may provide for a system that generates anti-noise by means of a sound transducer to compensate for noise experienced at the ears of a subject present in the magnetic resonance imaging system, the noise resulting from operation of the magnetic resonance imaging system. However, that is not an easy task. The noise cannot—as done outside of the field of magnetic resonance imaging systems—be measured on-the-fly and then directly be inverted and the inverted noise be used as anti-noise for compensation purposes. The noise patterns in the magnetic resonance imaging systems may be too complex and the noise may be too quickly changing for such a procedure. Runtime sensing of the noise, processing it to invert and playing it in synchronization with the actual noise is challenging. The real noise that occurs and is experienced at the ears of a subject present in the magnetic resonance imaging system, can further not be easily predicted by simple means in a reliable manner as it is dependent on many factors beyond the gradients like system hardware conditions and gradient fixtures etc.

Embodiments may provide a reliable prediction by using two approaches: first, one does not only rely on a sole dependency of the noise on the gradient coil pulse commands, but rather refers to both the gradient coil pulse commands and at least one further parameter describing an imaging of the subject. Secondly, a trained machine learning system is used to predict the noise, i.e., to provide information as to which anti-noise to use.

In one aspect the invention provides for a method of generating anti-noise in a first magnetic resonance imaging system comprising a bore for receiving a subject to be imaged, wherein the first magnetic resonance imaging system is configured for acquiring imaging k-space data from an imaging zone defined in the bore, wherein the first magnetic resonance imaging system comprises a magnetic field gradient coil system configured for generating magnetic gradient fields within the imaging zone and a memory containing pulse sequence commands configured for controlling the first magnetic resonance imaging system to acquire the imaging k-space data according to a magnetic resonance imaging protocol, wherein the memory further comprises gradient coil pulse commands configured for controlling the magnetic field gradient coil system during the acquisition of the imaging k-space data. The method comprises receiving a selection input for selecting, out of the gradient coil pulse commands, a first set of gradient coil pulse commands, and to then providing the selected gradient coil pulse commands and at least one value relating to a respective at least one further parameter describing an imaging of the subject to a trained machine learning system. In response to this providing, the method comprises receiving from the machine learning system information as to anti-noise to be generated by a sound transducer to compensate for noise experienced at the subject's ears and resulting from operation of the magnetic resonance imaging system with the first set of gradient coil pulse commands and under the constraints of the at least one value. The method further comprises controlling the first magnetic resonance imaging system with the pulse sequence commands and the first set of gradient coil pulse commands for acquisition of the imaging k-space data, and operating the sound transducer for generating anti-noise using the information as output by the trained machine learning system synchronized with the controlling of the magnetic field gradient coil system with the selected gradient coil pulse commands.

In accordance with an embodiment, the at least one further parameter comprises one or more parameters defining the field strength $B_0$ of the static main magnetic field of the first magnetic resonance imaging system. Although the noise is caused as such when the control of the magnetic field gradient coil system takes place, the noise strength, pitch, and pattern might have a more or less strong dependency on the basic static field $B_0$. The related parameter values might be generally stored in the memory, as an information about the magnetic resonance imaging system per se. Since the training of the trained machine learning system might have been occurred with magnetic resonance imaging systems having all a different field strength $B_0$, or least only partly a different field strength $B_0$, the use of the respective information assists in more precisely predicting the noise.

In accordance with an embodiment, the at least one further parameter comprises one or more parameters defining the magnetic field gradient general configuration. This might relate to the maximum amplitude (voltage), to the maximum slew rate (speed at which the gradient can be turned on and off, i.e. maximum gradient strength/rise time, as e.g. measured in milliTesla per second), and to the Grms, i.e., the gradient current root mean square that is sent into the magnetic field gradient coil system as measured in Ampere. These values are not directly related to the gradient coil pulse commands, and it may thus be beneficial to refer to them for being able to better predict the real noise. The related parameter values might be generally stored in the memory, as an information about the magnetic resonance imaging system per se.

In accordance with another embodiment, the at least one further parameter comprises one or more parameters indicating scan commands in the memory to be used for acquiring the k-space data. These scan commands may relate to the echo time TE, to the repetition time, TR, both for instance measured with respect to 64 pixel data packages. The scan commands may as well relate to the resolution, e.g. as indicated by Xres and Yres, to the image quality e.g. as indicated by the readout bandwidth RBW, to the slice thickness, to NSA (number of sampling average) and to the FOV (field of view). All of these parameters are well-known as indicators for properties of the operation of the magnetic resonance imaging system, and each of them might influence the generated noise. The related parameter values might be stored in the memory, as a result of a respective input e.g. of an operator for a given scan. Such input might consist in a selection out of multiple options that are generally stored in the memory.

In accordance with another embodiment, the at least one further parameter comprises one or more parameters indicating a relative orientation of the subject to the bore. Such indication might be made by referring to the anatomical portion of the subject (patient) in the bore of the magnetic resonance imaging system. For instance, there might be multiple options that are generally stored in the memory such as "head", "neck", "thorax", "abdomen", "pelvis", "foot", "extremities", and the parameter might be indicated by a numerical value (e.g., 1 to 7) as to the option selected by an input of an operator (or of a system that automatically detects the anatomical portion of the subject). The relative orientation of the subject to the bore might as well be indicated by a measured parameter such as to the depth of how deep the subject is introduced. This embodiment is based on the findings that the noise generated in the bore might be dependent not only from the magnetic resonance imaging system as such, but as well from how the subject is located in the bore.

In accordance with another embodiment, the at least one further parameter comprises one or more parameters indicating or defining a physical shape of the subject. This might be an indication of the sex, the height and/or the weight of the subject. The parameter as to sex might be indicated by a numerical value (e.g., 1 or 2, or 1, 2, 3 or 1, 2, 3, 4) as to the option out of options in the memory selected by an input of an operator (or of a system that automatically detects the subject). The parameter as to the height and/or the weight of the subject might be indicated as an integer or a real value by an input of an operator (or of a system that automatically detects the subject). This embodiment is based on the findings that the noise generated in the bore might be dependent not only from the magnetic resonance imaging system as such, but as well from the subject as compared to another subject.

In accordance with another embodiment, the at least one further parameter comprises all of the parameters out of the above-named parameters. Hence, all of those parameters that may have an influence on the noise are regarded, and they are used for and by the trained machine learning system. One may note that the trained machine learning system may be intended for a specific class of magnetic resonance imaging systems, and thus, some of those parameters named above might be omitted. For instance, if the field strength $B_0$ of the static main magnetic field of the first magnetic resonance imaging system has been always the same, in the training, and will be the same upon later use, then, the respective information is not necessarily needed. On the other hand, the machine learning system might be intended for a specific class of magnetic resonance imaging systems including different bore lengths or heights, and thus these parameters might as well be used upon training and later-on with the trained machine learning system.

In accordance with another embodiment, the at least one further parameter is received via an input device of the magnetic resonance imaging system. Hence, the noise is correctly being handled as dependent on e.g. user input. Alternatively, the input may be in an e.g. automated manner in which the input is received from a medical information system or another system that is coupled to the MRI system. Another example of such a system may be a medical practice management software (PMS) is a category of healthcare software that deals with the day-to-day operations of a medical practice.

In accordance with another embodiment, the sound transducer comprises anyone of a loudspeaker in the inside of the bore of the first magnetic resonance imaging system, earphones to be worn by the subject, a headset to be worn by the subject, and headphones to be worn by the subject. Each of these options enables to provide for a good placement of the anti-noise with respect to the subject's ears.

In another embodiment the method comprises providing the trained machine learning system by receiving a training data set comprising associations of training sets of gradient coil pulse commands and training values relating to parameters describing an imaging of a training subject with noise experienced at the training subject's ears and generated over time when operating of a training magnetic resonance imaging system with the training sets of gradient coil pulse commands and under the constraints of the training values, and by a training a machine learning model using the training sets of gradient coil pulse commands, the training values and the noise as input, the training resulting in the trained machine learning system. Hence, the method does not rely on predetermined trained machine learning systems but includes the training as such.

In accordance with another embodiment, the training values relate to one or more of those parameters discussed above, wherein to these same parameters other values are later-on used as inputs to the trained machine learning system. It is generally advantageous and leads to higher accuracy to use the same parameters for training as for a later input that is intended for obtaining an output.

In accordance with another embodiment, the training magnetic resonance imaging system is a simulated magnetic resonance imaging system and the noise is simulated noise of the simulated magnetic resonance imaging system. Here, the use of simulation tools might prove economic and at the same time sufficiently precise.

In accordance with another embodiment, the training magnetic resonance system corresponds to the first magnetic resonance system. Hence, the trained machine learning system is trained upon normal use of the first magnetic resonance system, which both is economic, and leads to a more and more sophisticated and precise machine learning system.

In accordance with another embodiment, the training magnetic resonance imaging system is a second magnetic resonance imaging system and the noise is measured noise of the second magnetic resonance imaging system. This separation of training and use of the machine learning system might assist in excluding artefacts and might be effective under a practical standpoint and mainly be most economic.

In another aspect the invention provides for a magnetic resonance imaging system configured for acquiring imaging k-space data from an imaging zone in a bore of the magnetic resonance imaging system for receiving a subject to be imaged, wherein the magnetic resonance imaging system comprises a magnetic field gradient coil system configured for generating magnetic gradient fields within the imaging zone. The magnetic resonance imaging system comprises a memory containing pulse sequence commands configured for controlling the first magnetic resonance imaging system to acquire the imaging k-space data according to a magnetic resonance imaging protocol. The memory further comprises gradient coil pulse commands configured for controlling the magnetic field gradient coil system during the acquisition of the imaging k-space data. The memory still further contains machine executable instructions. The magnetic resonance imaging system further comprises at least one sound transducer configured for outputting anti-noise, and a processor configured for controlling the magnetic resonance imaging system. Execution of the machine executable instructions causes the processor to receive a selection input for selecting, out of the gradient coil pulse commands, a first set of gradient coil pulse commands. Execution of the machine executable instructions further causes the processor to provide the selected gradient coil pulse commands and at least one value relating to a respective at least one further parameter describing an imaging of the subject to a trained machine learning system external to the processor. Execution of the machine executable instructions further causes the processor to—in response to the providing—, receive from the machine learning system information as to anti-noise to be generated by a sound transducer to compensate for noise experienced at the subject's ears and resulting from operation of the magnetic resonance imaging system with the first set of gradient coil pulse commands and under the constraints of the at least one value. Execution of the machine executable instructions further causes the processor to control the first magnetic resonance imaging system with the pulse sequence commands and the first set of gradient coil pulse commands for acquisition of the imaging k-space data. Execution of the machine executable instructions further causes the processor to operate the sound transducer for generating anti-noise using the information as output by the trained machine learning system synchronized with the controlling of the magnetic field gradient coil system with the selected gradient coil pulse commands.

In accordance with another embodiment, at least one value of the at least one value refers to preparatory scan commands. These provide an important influence on the noise.

In accordance with another embodiment, execution of the machine executable instructions causes the processor to reconstruct magnetic resonance imaging data from the imaging k-space data. Hence, this task remains internal.

In accordance with another embodiment, the trained machine learning system is implemented by a neural network that is part of the magnetic resonance imaging system. Then, the trained machine learning system is most easily available and at hand.

In accordance with another embodiment, the magnetic resonance imaging system is configured to be coupled to a neural network that implements the trained machine learning system external to the magnetic resonance imaging system. Then, the trained machine learning system might be usable by multiple magnetic resonance imaging systems and might be more easily further trained with external training data sets.

In another aspect the invention provides a medical system, wherein the medical system comprises:
a memory storing machine executable intructions;
a processor configured for controlling the medical system, wherein execution of the machine executable instructions causes the processor to control the medical system to provide a trained machine learning module trained to output, for a magnetic resonance imaging system, information as to anti-noise to be generated by a sound transducer of the magnetic resonance imaging system in response to an input of selected gradient coil pulse commands for said magnetic resonance imaging system and at least one value relating to a respective at least one further parameter describing an imaging of a training subject with noise experienced at the training subject's ears in the magnetic resonance imaging system; wherein the providing of the trained machine learning module comprises:
providing a machine learning model;
providing training data comprising associations of training sets of gradient coil pulse commands and training values relating to parameters describing an imaging of a training subject with noise experienced at the training subject's ears or elsewise at the training subject within the magnetic resonance imaging system and generated over time when operating of a training magnetic resonance imaging system with the training sets of gradient coil pulse commands and under the constraints of the training values;
training the machine learning model using the training sets of gradient coil pulse commands and the training values as input and the noise as output, the training resulting in the trained machine learning system.

The training subject might be a living subject or a dummy device, such as a water container.

By such medical system, the trained machine learning model used with the magnetic resonance imaging system according to the other aspect is suitably obtained. The medical system may here be as well a magnetic resonance imaging system, wherein the transducer here has a function of a microphone. Specifically, the medical system may itself provide the training data used in the training of the machine learning model.

Using the trained machine learning system may include providing selected gradient coil pulse commands and at least one value relating to a respective at least one further parameter describing an imaging of the subject to a trained machine learning system, and in response to the providing, receiving from the machine learning system information as to anti-noise to be generated by a sound transducer to compensate for noise experienced at the subject's ears and resulting from operation of the magnetic resonance imaging system with the first set of gradient coil pulse commands and under the constraints of the at least one value.

In another aspect, a method of obtaining a trained machine learning model for use with a magnetic resonance imaging system is provided, wherein obtaining the trained machine learning module comprises:

providing a machine learning model;

providing training data comprising associations of training sets of gradient coil pulse commands and training values relating to parameters describing an imaging of a training subject with noise experienced at the training subject's ears or elsewise at the training subject within the magnetic resonance imaging system and generated over time when operating of a training magnetic resonance imaging system with the training sets of gradient coil pulse commands and under the constraints of the training values;

training the machine learning model using the training sets of gradient coil pulse commands and the training values as input and the noise as output, the training resulting in the trained machine learning system.

In still another aspect, the invention is provided as computer program comprising machine executable instructions configured for performing the method of obtaining a trained machine learning model.

In another aspect the invention provides for a computer program comprising machine executable instructions configured for controlling a magnetic resonance imaging system to acquire imaging k-space data from an imaging zone, wherein the magnetic resonance imaging system comprises a magnetic field gradient coil system configured for generating magnetic gradient fields within the imaging zone, a memory containing pulse sequence commands configured for controlling the first magnetic resonance imaging system to acquire the imaging k-space data according to a magnetic resonance imaging protocol, wherein the memory further comprises gradient coil pulse commands configured for controlling the magnetic field gradient coil system during the acquisition of the imaging k-space data—The execution of the machine executable instructions causes the processor to receive a selection input for selecting, out of the gradient coil pulse commands, a first set of gradient coil pulse commands. Execution of the machine executable instructions further causes the processor to provide the selected gradient coil pulse commands and at least one value relating to a respective at least one further parameter describing an imaging of the subject to a machine learning system external to the processor. Execution of the machine executable instructions further causes the processor to—in response to the providing —, receive from the machine learning system information as to anti-noise to be generated by a sound transducer to compensate for noise experienced at the subject's ears and resulting from operation of the magnetic resonance imaging system with the first set of gradient coil pulse commands and under the constraints of the at least one value. Execution of the machine executable instructions further causes the processor to control the first magnetic resonance imaging system with the pulse sequence commands and the first set of gradient coil pulse commands for acquisition of the imaging k-space data. Execution of the machine executable instructions further causes the processor to operate the sound transducer for generating anti-noise using the information as output by the trained machine learning system synchronized with the controlling of the magnetic field gradient coil system with the selected gradient coil pulse commands.

It is understood that one or more of the aforementioned embodiments of the invention may be combined as long as the combined embodiments are not mutually exclusive.

As will be appreciated by one skilled in the art, aspects of the present invention may be embodied as an apparatus, a method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. 'Computer memory' or 'memory' is an example of a computer-readable storage medium.

Computer memory is any memory which is directly accessible to a processor. 'Computer storage' or 'storage' is a further example of a computer-readable storage medium. Computer storage is any non-volatile computer-readable storage medium. In some embodiments, computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on-the-fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity.

Thus, when referring to a system or process involving multiple entities, the computer program or program instructions are understood to be adapted to be executed by a processor associated or related to the respective entity.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'medical system' as used herein encompasses any system comprising a memory storing machine executable instructions and a computational system, e.g., a processor configured for executing the machine executable instructions, where execution of the machine executable instructions causes the computational system to provide or process medical images. The medical system may be configured for using a trained machine learning module to train a machine learning module for providing information as to anti-noise to be generated. The medical system may further be configured for generating medical images using medical imaging data and/or for acquiring the medical imaging data for generating medical images.

K-space data is defined herein as being the recorded measurements of radio frequency signals emitted by atomic spins using the antenna of a Magnetic resonance apparatus during a magnetic resonance imaging scan. Magnetic resonance data is an example of medical image data. A Magnetic Resonance Imaging (MRI) image or MR image is defined herein as being the reconstructed two- or three-dimensional visualization of anatomic data contained within the k-space data. This visualization can be performed using a computer.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

Like numbered elements in these figures are either equivalent elements or perform the same function. Elements which have been discussed previously will not necessarily be discussed in later figures if the function is equivalent.

Figure 1:
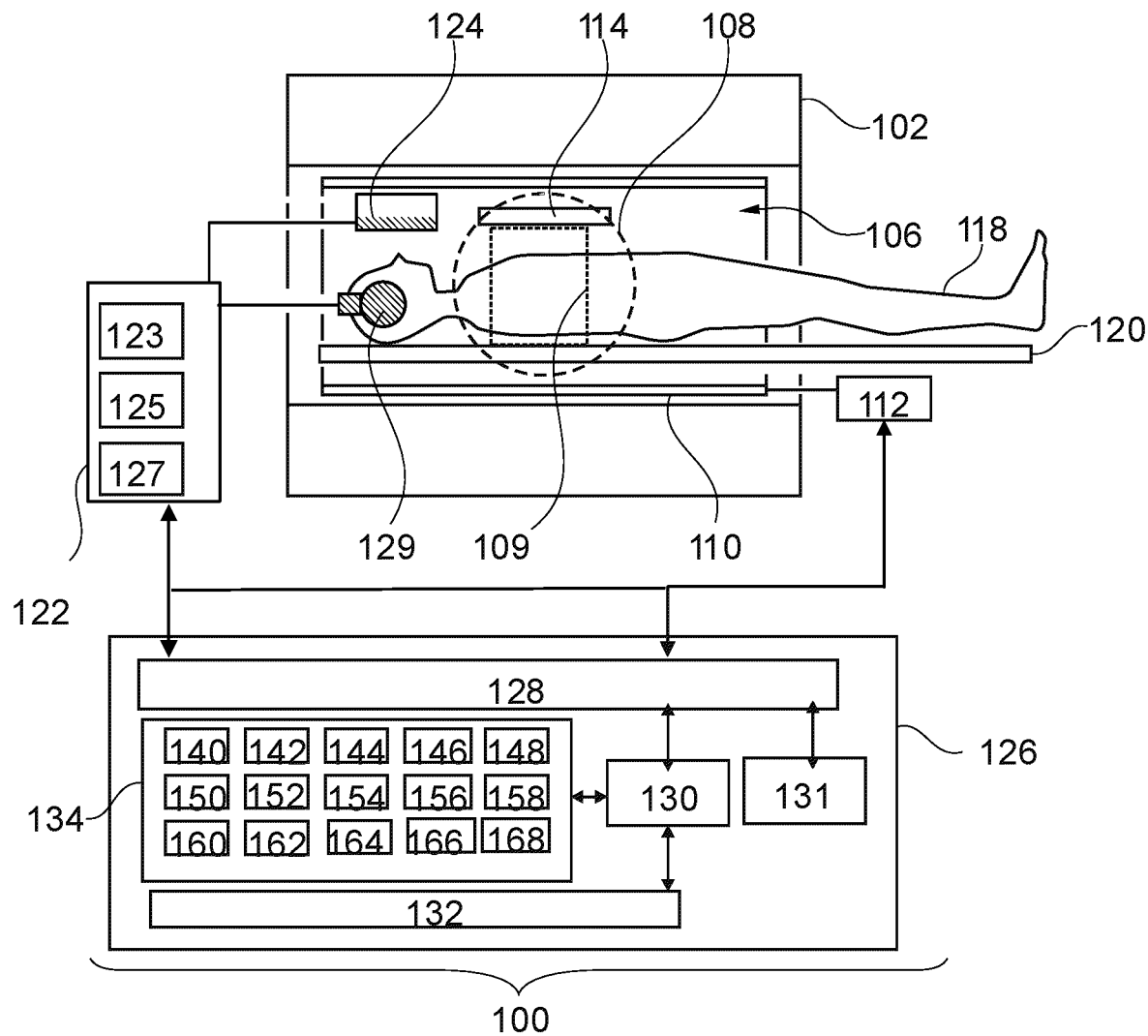
FIG. 1 illustrates an example of a magnetic resonance imaging system.
Figure 2:
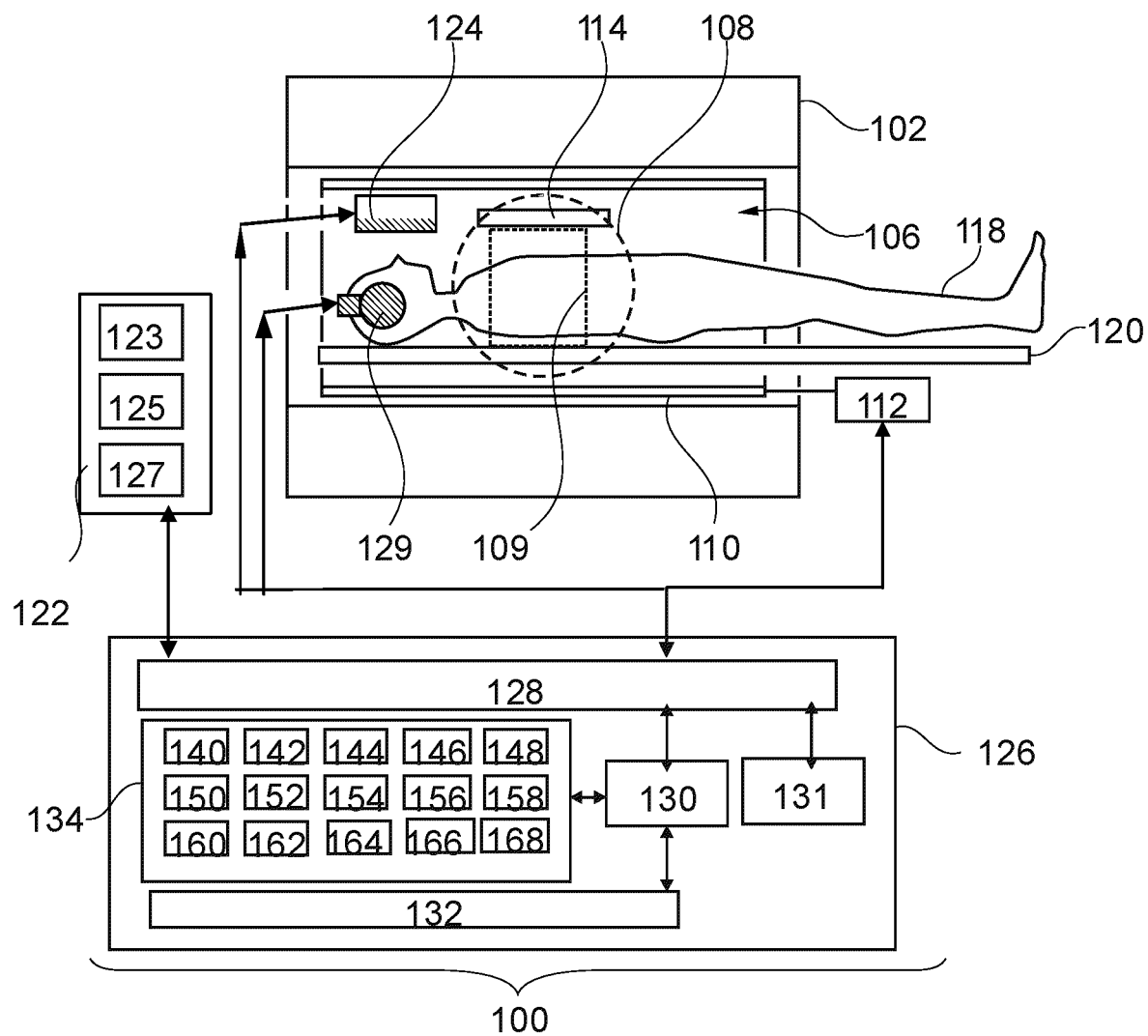
FIG. 2 illustrates another example of a magnetic resonance imaging system.

FIG. 1 and FIG. 2 both illustrate an example of a magnetic resonance imaging system 100. The magnetic resonance imaging system comprises a magnet 102. The magnet 102 may for example be a superconducting magnet. Alternatively, the magnet 102 may be a resistive type magnet.

The use of different types of magnets is also possible; for instance it is possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils. Within the bore 106 of the cylindrical magnet 102 there is an imaging zone 108 where the magnetic field is strong and uniform enough to perform magnetic resonance imaging. A region of interest 109 is shown within the imaging zone 108. A subject 118 is shown as being supported by a subject support 120 such that at least a portion of the subject 118 (namely the anatomy of the subject 118 that needs to be imaged) is within the imaging zone 108 and the region of interest 109.

Within the bore 106 of the magnet there is also a set of magnetic field gradient coils 110 which is used for acquisition of preliminary magnetic resonance data to spatially encode magnetic spins within the imaging zone 108 of the magnet 102. The magnetic field gradient coils 110 are connected to a magnetic field gradient coil power supply 112. The magnetic field gradient coils 110 are intended to be representative. Typically magnetic field gradient coils 110 contain three separate sets of coils for spatially encoding in three orthogonal spatial directions. A magnetic field gradient power supply supplies current to the magnetic field gradient coils. The current supplied to the magnetic field gradient coils 110 is controlled as a function of time and may be ramped or pulsed.

Adjacent to the imaging zone 108 is a radio-frequency coil 114 for receiving radio transmissions from spins also within the imaging zone 108. In some examples, the radio-frequency coil may also be configured for manipulating the orientations of magnetic spins within the imaging zone 108. The radio frequency antenna may contain multiple coil elements. The radio frequency antenna may also be referred to as a channel or antenna. The radio-frequency coil 114 is connected to a radio frequency receiver or transceiver not depicted here. The radio-frequency coil 114 and radio frequency transceiver may be optionally replaced by separate transmit and receive coils and a separate transmitter and receiver. It is understood that the radio-frequency coil 114 is representative. The radio-frequency coil 114 could also represent a dedicated transmit antenna and a dedicated receive antenna. Likewise there might also be a separate transmitter and receivers. The radio-frequency coil 114 may also have multiple receive/transmit elements and the radio frequency transceiver may have multiple receive/transmit channels. For example if a parallel imaging technique such as SENSE is performed, the radio-frequency could 114 will have multiple coil elements.

The magnetic resonance imaging system 100 is exemplary shown as comprising a machine learning system 122. However, in an alternative the machine learning system 122 may be external to the system 100. The machine learning system 122 may be used to provide anti-noise. The machine learning system 122 is shown as coupled to a sound transducer, e.g., a loudspeaker 124 and/or a set of headphones 129. Both the sound transducer 124 and the headphones 125 can be used to provide anti-noise with respect to noise that occurs upon operation of the magnetic resonance imaging system 100. In not all embodiments both, the loudspeaker 124 and the headphones 129, are necessary, one of these may be sufficient. Although here only a single loudspeaker 124 is depicted, there may as well be four loudspeakers 124 in the bore, e.g. equally distributed, for instance a pair of two at the one (horizontal) end, a pair of two at the other (horizontal) end, and the loudspeakers 124 pairwise opposed with one on top and one on bottom. There might be other arrangements with four loudspeakers and further alternatively be two, three, five or more loudspeakers. The sound transducer 124 and the headphones 129 may be constructed using magnetic resonance imaging compatible technology. The machine learning system 122 is shown to comprise an auto encoder unit 123, a regression network unit 125, and a unit 127 responsible for interaction and data exchange between the auto encoder unit 123 and the regression network unit 125 and with external entities.

The gradient controller 112 is shown as being connected to a hardware interface 128 of a computer system 126. Optionally (as shown), but not in any case needed, the machine learning system 122 is as well connected to the hardware interface 128. The computer system further comprises a processor 130 that is in communication with the hardware system 128, a clock 131, a memory 134, and a user interface 132. The memory 134 may be any combination of memory which is accessible to the processor 130. This may include such things as main memory, cached memory, and also non-volatile memory such as flash RAM, hard drives, or other storage devices. In some examples, the memory 130 may be a non-transitory computer-readable medium.

The memory 134 is shown as containing machine-executable instructions 140. The machine-executable instructions 140 provide a means for the processor 130 to control the magnetic resonance imaging system 100. The machine-executable instructions 140 may also enable the processor 130 to perform various data analysis and image reconstruction tasks. The machine-executable instructions 140 may also enable the processor 130 to control the user interface 132 in a manner as to offer inputs to be made, for instance by asking for inputs (by a mask layer with a display user interface, or by audio commands at an audio user interface), namely by enabling a selection out of predetermined units or a numerical input. The machine-executable instructions 140 may then further enable the processor 130 to receive these inputs and to cause the input data to be stored in the memory 134.

The memory 134 is as well shown as containing multiple preparatory scan commands 142. The memory 134 is then shown as containing selected preparatory scan commands 144.

The memory 134 is shown as optionally containing configuration data 146. The configuration data 146 is data that was acquired or derived during performing of the preparatory scan commands 144. In some examples this may be used for configuring the pulse sequence commands 148. The pulse sequence commands 148 are shown as being stored in the memory 134 as well. The pulse sequence commands 148 are commands or data which may be converted into such commands which may be used to control the magnetic resonance imaging system to acquire k-space data. The memory 134 is shown as containing imaging k-space data 150 that was acquired by controlling the magnetic resonance imaging system with the pulse sequence commands 148. The memory 134 is further shown as containing magnetic resonance imaging data 152 that was reconstructed from the imaging k-space data 150. The imaging k-space data 150 may for example be acquired for the region of interest 109.

The pulse sequence commands 148 may contain gradient coil pulse commands 154. The gradient coil pulse commands 154 are commands or data which may be converted into such commands which control the controlled magnetic field gradient coil power supply 112 to provide the magnetic field gradient coils 110 with current. When this happens, it may produce a large auditory noise in the bore 106 of the magnet 102. The memory 134 is further shown as containing a gradient pulse starting time 156 and a predetermined time 158. The gradient pulse starting time 156 is a time when the execution of the gradient coil pulse commands 158 is started. This is essentially a start of when large noises may be produced in the bore 106 of the magnet 102. When knowing what the gradient pulse starting time 156 is the anti-noise can be provided related to the predetermined time 158 in a predetermined manner, namely so as to synchronize the generation of anti-noise to the large auditory noise.

The machine-executable instructions 140 provide means to cause the processor to control the sound transducer 124 and the headphones 129 via the machine learning system 122. Namely the anti-noise signals are preferably always played from the machine learning system 122. The time to start playing the signal is based on gradient start time 156 as received as a machine-executable instructions 140 through hardware interface 128. The machine learning system 122 does in most embodiments communicate with the memory 134 using the hardware interface 128 and controls the sound transducer 124 and/or the headphones 129 in or by playing the anti-noise signal. However, the communication might include as well other paths: Whilst FIG. 1 illustrates that the hardware interface 128 is optionally coupled to the gradient controller 112 and the machine learning system 122, FIG. 2 shows the hardware interface 128 to be as well optionally coupled to the sound transducer 124 and the headphones 129.

The machine learning system receives as inputs via the user interface 132 a selection of first gradient coil pulse commands 160 out of the gradient coil pulse commands 154. The memory further stores values 162 that are generally relating to parameters of the magnetic resonance imaging system 100 and are constant with the magnetic resonance imaging system 100. Such a further value may relate to the strength of the magnet 102 (in Tesla, or the like). A plurality of possible selectable values 164 are stored in the memory as well, and the values 166 resulting of a related dedicated input via the user interface 132 are as well stored in the memory 134. For instance, the possible selectable values 164 may comprise an indication as to the anatomical portion of the subject 118 that is present in the imaging zone. An operator might be able to select from values 164 indicating "head" (e.g., "1"), "neck" ("2"), "thorax" ("3"), "abdomen" ("4"), "pelvis" ("5"), "foot" ("6"), "extremities" ("7"), one of these and store the selected value 166 in the memory. Moreover, the memory is further shown to store further values 168 (e.g., numerical values) that are freely, without a major limitation, input via the user interface 132. Such further values may include those indicating the age, height and/or weight of the subject 118.

Figure 3:
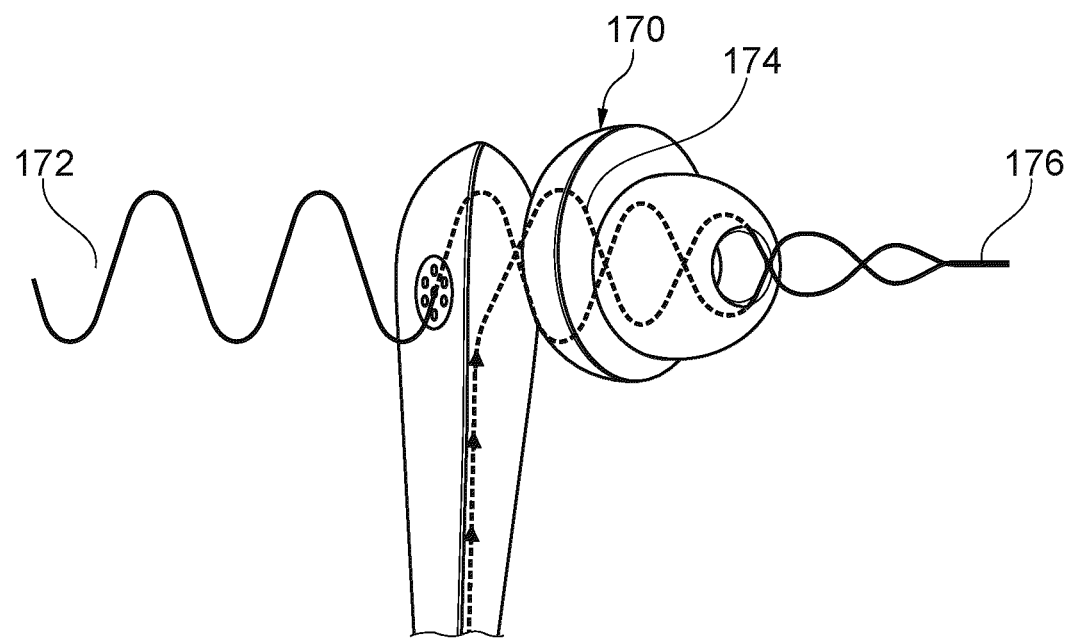
FIG. 3 illustrates the operation principle of noise cancellation.

FIG. 3 schematically illustrates the operation principle of noise cancellation at an earplug 170. The impinging noise here represented by the sound wave 172 is compensated by superimposition of the same wave that is, however, inverted to form inverted wave 174. "Inverting" means that the wave is phase-shifted by 180°. Hence, superimposition of the wave 172 and the inverted wave 174 means that the noise is cancelled at 176. Whilst commonly the noise is recorded and inverted, the anti-noise is in the present embodiment predicted. Then, instead of inverting, directly an anti-noise wave is generated on the basis of values 160, 162, 164, 166 and 168 stored in the memory 130 (i.e., due to "predicted noise"), with the same effect of canceling. The timing is of course important. Here, the noise is predicted by inter alia referring to the selected gradient coil pulse commands 160. The related control is synchronized with the generation of the anti-noise, using the same clock 131.

Figure 4:
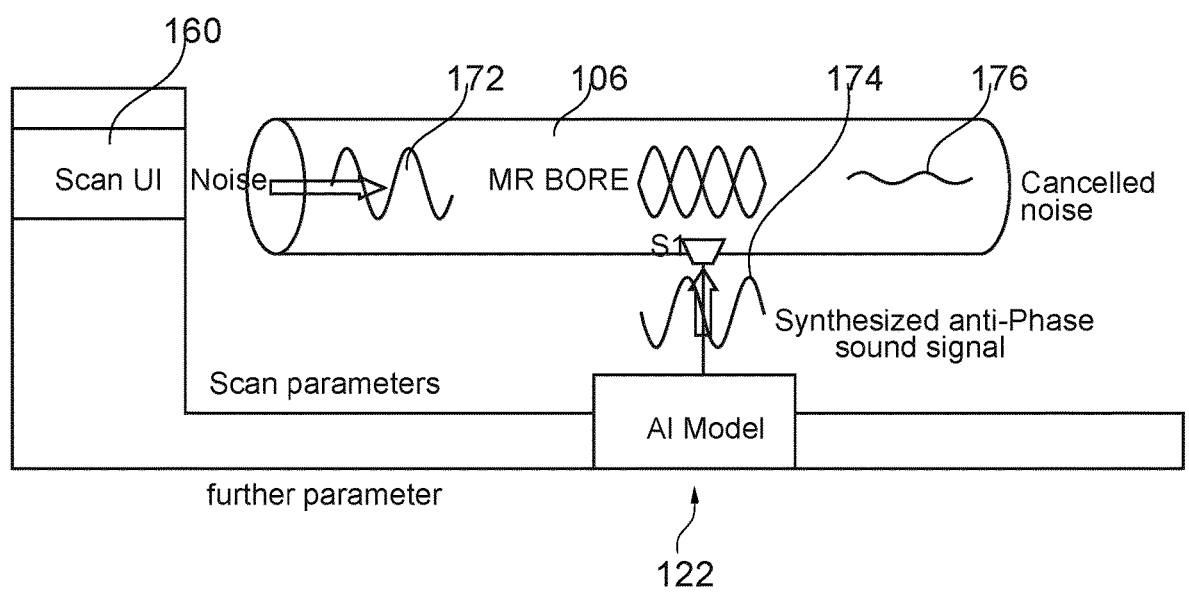
FIG. 4 illustrates an example of generating anti-noise in a schematic view.

FIG. 4 schematically illustrates an example of how the anti-noise is generated. Whilst the magnetic field gradient coils 110 are controlled by means of the selected gradient coil pulse commands 160, the respective information is provided as input to the machine learning system 122, here depicted as an Artificial Intelligence, AI, model. A further value is as well provided to the machine learning system 122, e.g., one or more out of the values 162, 164, 166, 168. The noise 112 in the bore 106 is compensated by the output of the machine learning system 122, i.e., the anti-noise 174 to provide the cancelled noise 176. The machine learning system 122 needs to be trained before such application.

Figure 5:
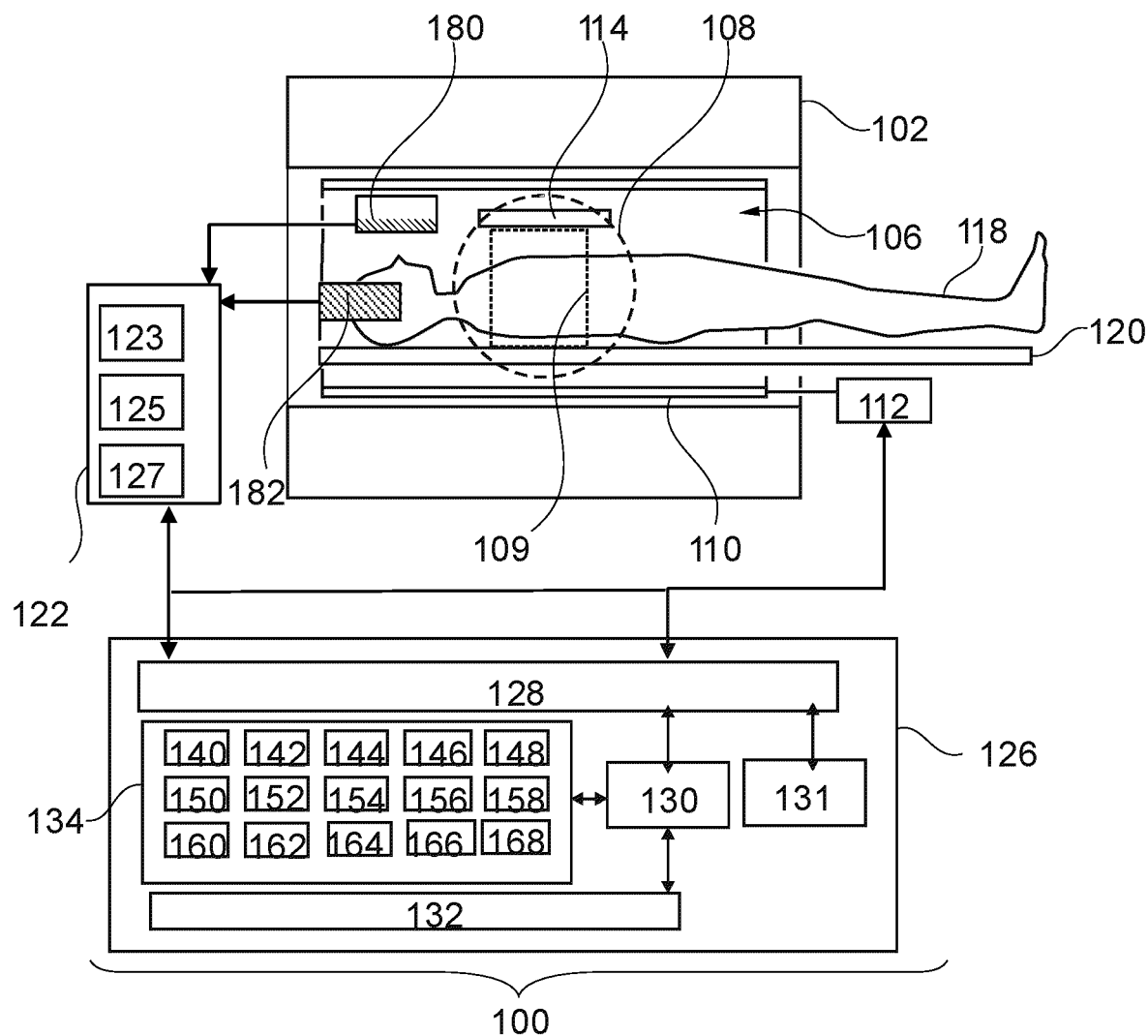
FIG. 5 illustrates another example of a magnetic resonance imaging system.

FIG. 5 illustrates an example of how the magnetic resonance imaging system 100 (or another magnetic resonance imaging system) might be used for training the machine learning system 122. The magnetic resonance imaging system 100 in the situation of FIG. 5 differs from magnetic resonance imaging system 100 in the situation of FIG. 1 in that a microphone 180 is placed in the bore to record the noise, and in that a further microphone is placed at 182 instead of headphones 129, i.e. at the position where noise cancelling is desired. In not all embodiments both the microphones 180 and 182, are necessary, one of these may be sufficient. The real noise 112 produced in the bore 106 can thus be recorded and provided as training data to the machine learning system 122. The training data further include those parameters that influence the noise, such as realized by values 162, 166, 168, and optionally 164. One may note that the values 162, 164, 166, 168 may be present, selected or input in the magnetic resonance imaging system 100 without the need for a sound transducer 124 or headphones 129. Basically, if in the magnetic resonance imaging system 100, the loudspeaker 124 shall provide the anti-noise, then the data obtained with microphone 180 would better be used for the training. If in the magnetic resonance imaging system 100, the headphones 129 shall provide the anti-noise, then the data obtained with microphone 182 would better be used for the training. For being able to later-on decide which of loudspeaker 124 and headphones 129 to use, or both, the training may be done with training data including sound (noise) recorded by both of the microphones 180 and 182.

Figure 6:
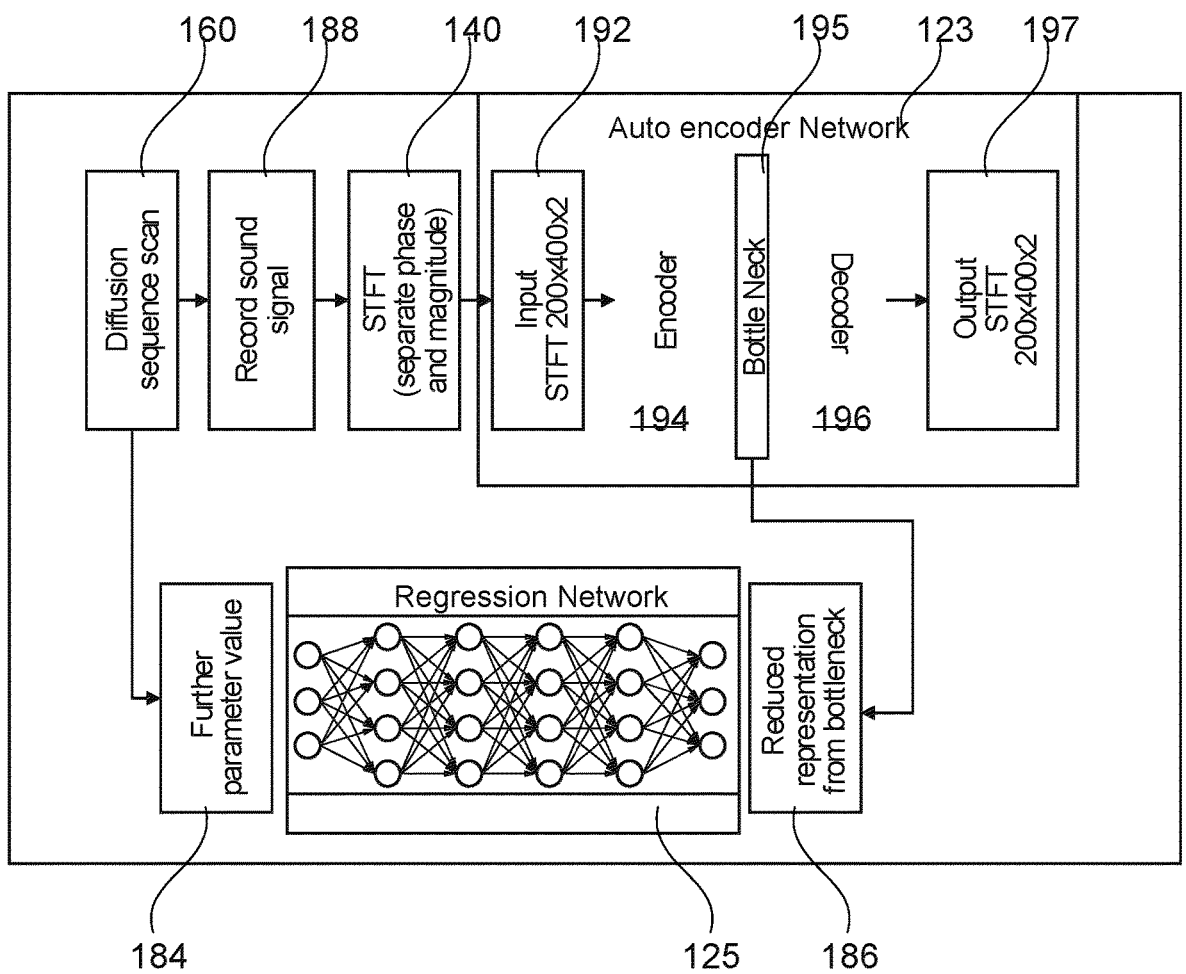
FIG. 6 illustrates a machine learning system as used during a training.

FIG. 6 illustrates an example of the machine learning system 122 with auto-encoder network unit 123 and regression network unit 125 while the machine learning system 122 is being trained. The sound signal (or noise signal) is recorded at 188, and at 190, a short-term Fourier Transform is applied to the data (STFT). The resulting data is input at 192 to the auto-encoder unit 123. An auto-encoder unit 123 is an unsupervised network learning system that imposes at a hidden layer 195—between an encoder 194 and a decoder 196—a bottleneck in the network which forces a compressed knowledge representation of the original input. This requires some dependency of the inputs which is the case with the recorded noise. Here, the bottleneck sends the data to the regression network 125 at the output 186 to perform training on regression network 125. The magnetic field gradient coils 110 are controlled by using the selected gradient coil pulse commands 160, and values for respective parameters and further parameters are input at 184. These are input to the regression network unit 125 (all of this and the latter controlled by means of unit 127), that outputs at 186 a reduced representation for the so-called bottleneck at hidden layer 195 of the auto-encoder unit 123. The output of the training from auto-encoder is provided at 197 as well in STFT format.

It has to be noted that instead of using a "real" MRI system with a microphone to record the noise, it may also be possible to simulate the emergence of noise for a given gradient and sequence related variables. Later feed this simulated noise as recorded noise at 188 and its related variables at 184 to the machine learning system 122 for the training.

Figure 7:
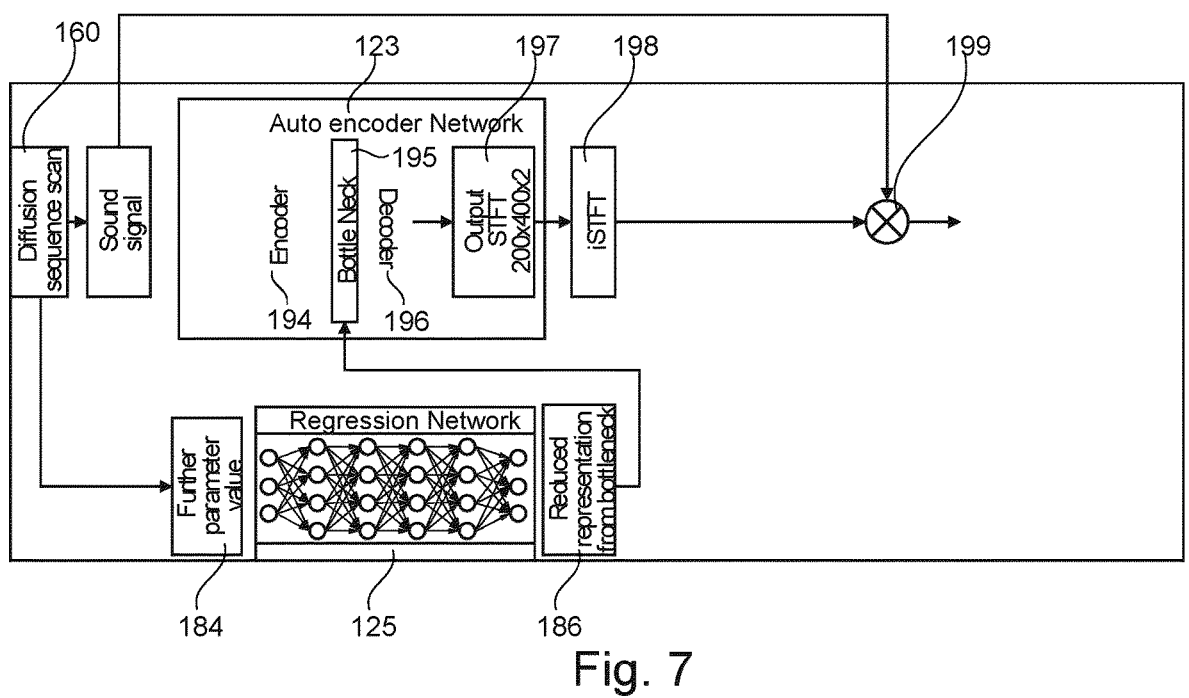
FIG. 7 illustrates the machine learning system of FIG. 6 as used after a training.

FIG. 7 illustrates an example of how the so-trained machine learning system 122 might be used for generating the anti-noise. Again, the magnetic field gradient coils 110 are controlled by using the selected gradient coil pulse commands 160, and values as to respective parameters and further parameters are input at 184. Now, instead of recording the sound or noise, the regression network 125 outputs at 186 the reduced representation for the bottleneck of the audio encoder unit 123, where this time, a prediction as to anti-noise is output at 198 and sent to the "noise compensation stage" 199 where it is "synchronized" with the noise. The noise compensation stage 199 might represent the sound transducer 124 or the headphones 129, where the anti-noise is as such generated and compensates the external noise. The noise compensation stage 199 might in addition (optionally) comprise the processor 130 that provides according to FIG. 2 a direct output to the sound transducer 124 or the headphones 129, or might optionally comprise any means that transforms the output at 198 of the audio encoder unit 123 to controller signals to be sent to the sound transducer 124 or the headphones 129. Noise compensation stage 199 might as well include using signals produced by the clock 131, Such signals of the clock 131 are used both for the timing of the control of the magnetic field gradient coils 110 with the gradient coil pulse commands and for the timing of the generation of the anti-noise synchronized with the timing of the control of the magnetic field gradient coils 110.

Figure 8A:
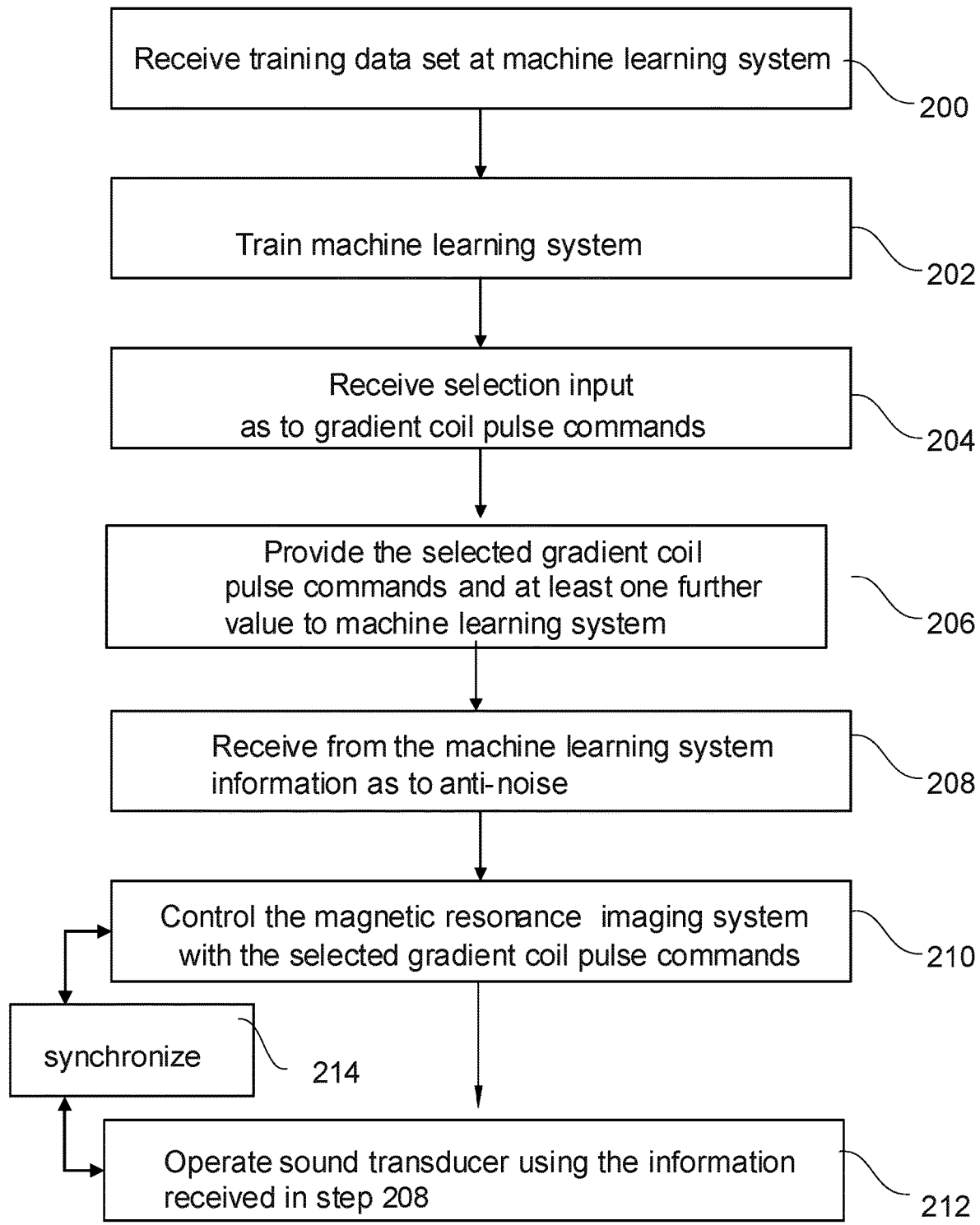
FIG. 8a shows a flow diagram illustrating an example of a method of generating anti-noise.
Figure 8B:
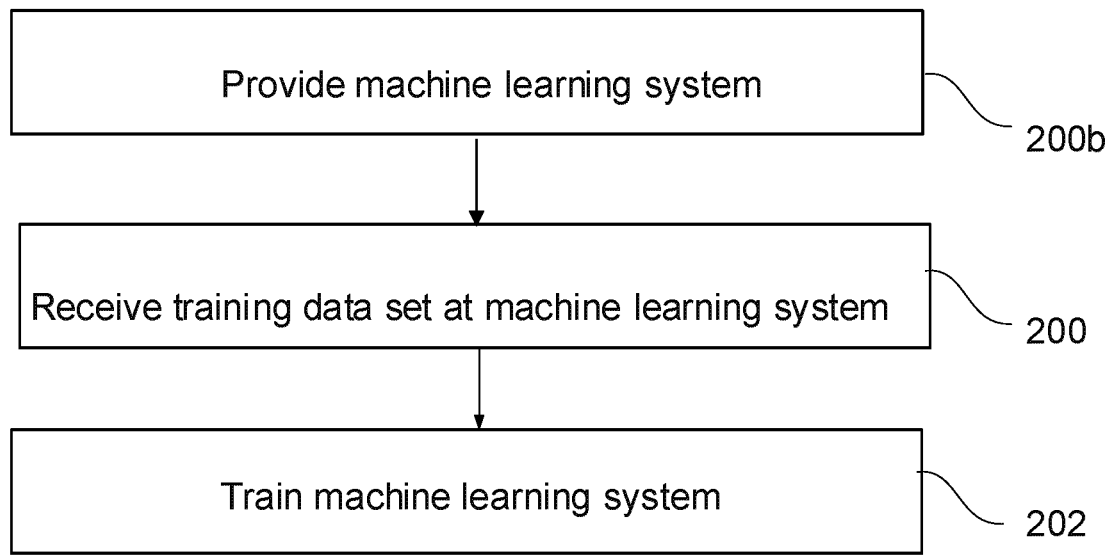
FIG. 8b shows a flow diagram illustrating only a method of obtaining the trained machine learning system.
Figure 8C:
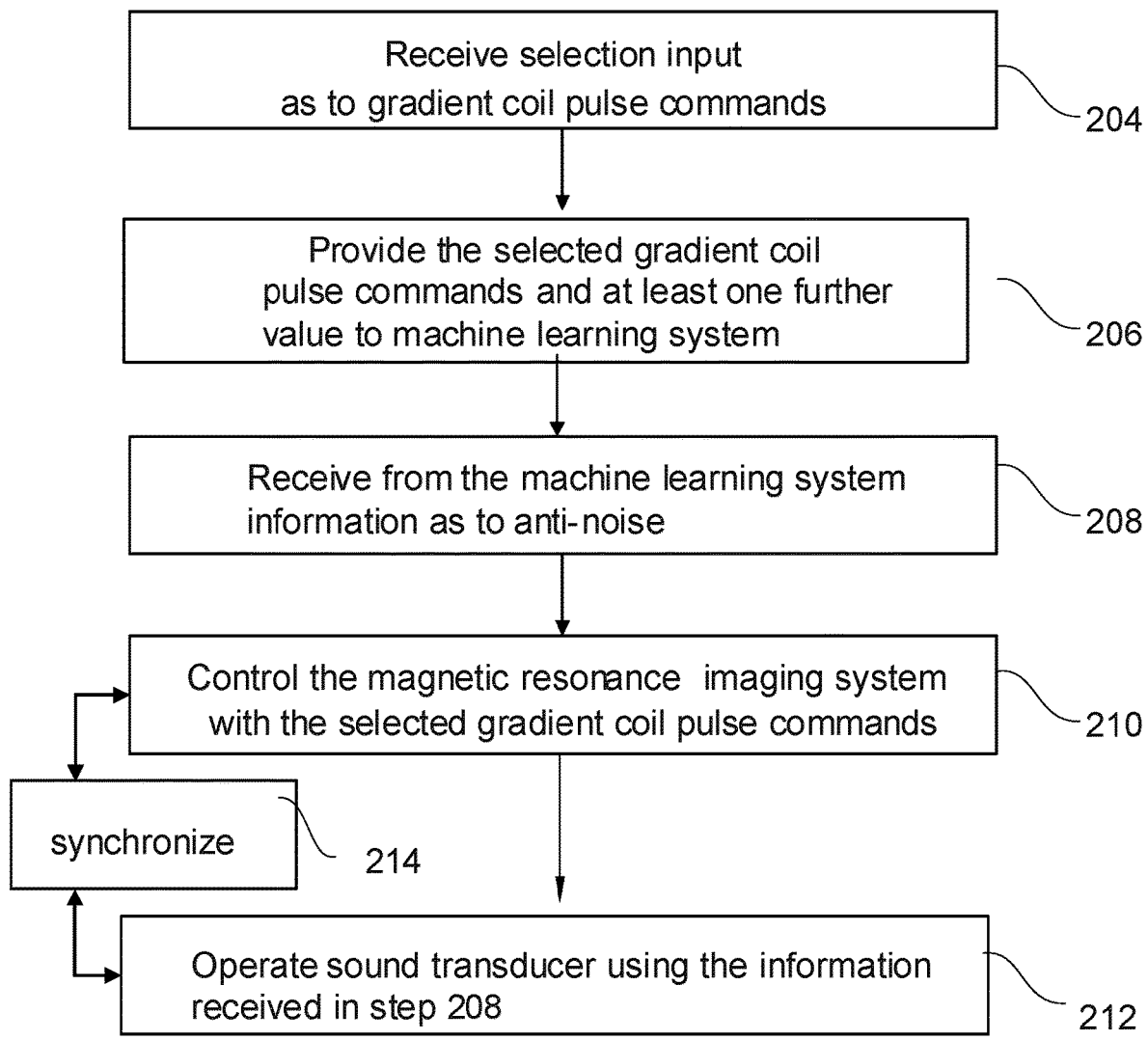
FIG. 8c shows a flow diagram illustrating only a method of generating anti-noise, wherein a trained machine learning system is already available.

FIG. 8a shows a flowchart which illustrates a method of operating the magnetic resonance imaging system 100. The method starts with obtaining the trained machine learning system at steps 200 and 202, and can optionally be started as well with step 204 once the training has already taken place. FIG. 8b is a flowchart which illustrates a method of obtaining the trained machine learning system alone, e.g., with the magnetic resonance imaging system of FIG. 5. This includes the step 200b of providing the machine learning system (generally as a model). The latter step might as well be included with the method of FIG. 8a. FIG. 8c is a flowchart which illustrates a method of generating anti-noise wherein the machine learning system is already trained, i.e., already provided as trained, and such method might be performed with the magnetic resonance imaging system of FIG. 1 or FIG. 2. (The method of FIG. 8a might be performed with a magnetic resonance system having both the loudspeakers as in FIG. 1 or FIG. 2 and the microphone of FIG. 5).

In step 200, common to FIGS. 8a and 8b, the training data set (associations of selected gradient pulse commands plus at least one value for a respective parameter plus recorded noise) is received at the machine learning system, which is then trained with these at step 202.

The method turns with the method of FIG. 8a to, and starts with the method of FIG. 8c at, step 204, where a selection input as to gradient coil pulse commands 160 is received, e.g. via user interface 132. Thereafter, in step 206, the selected gradient coil pulse commands and at least one further value are provided to machine learning system. Information as to anti-noise is the received in response to step 206 from the machine learning system. Step 210 comprises to control the magnetic resonance imaging system with the selected gradient coil pulse commands, and in step 212 the sound transducer (124 or headphones 129) is operated using the information received in step 208. Steps 210 and 212 are being performed in parallel, i.e. are synchronized by step 214. The timing might however be such precise, anyhow, that the step 214 may be omitted.

Figure 9A:
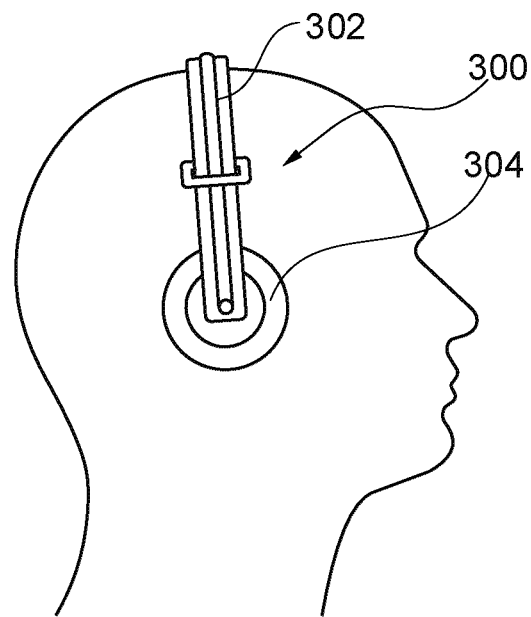
FIG. 9a shows an example of a headset.

FIG. 9a shows an example of a headset. The headset indicated at 300 comprises a clip 302 for being placed on the head and two earpieces (one is shown only) indicated at 304. Commonly, the earpiece 304 includes sponge foam to be worn comfortable and a sound transducer (not shown) for producing anti-noise.

Figure 9B:
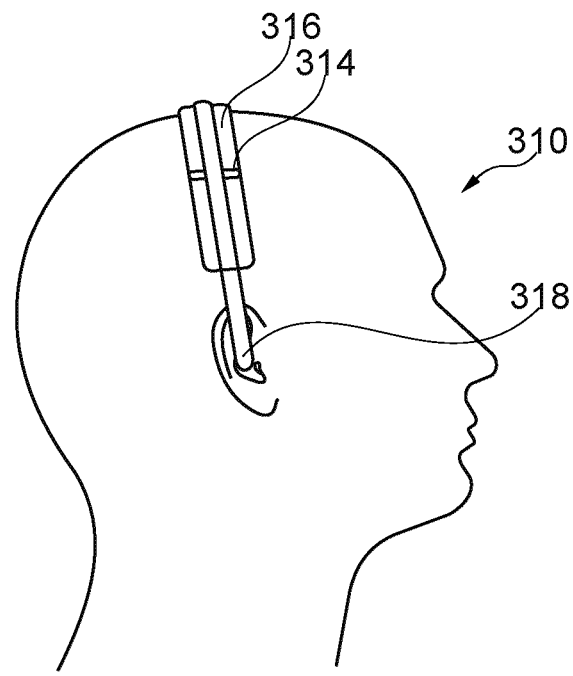
FIG. 9b shows another example of a headset.

FIG. 9b shows another example of a headset 310. This headset 310 differs from the headset 300 in that a sponge 316 is placed below of a clip 314, wherein the clip is shaped as a hollow 10 tubelet where the anti-noise directly exits at an outlet 318 thereof. The transducer might the be placed in the tubelet, or outside of the headset.

Both the headsets 300 and 310 might be used with an embodiment.

Further alternatively, the headset might comprise for at least one ear of the subject (patient), preferably for both ears, a closed bowl-like or cup-shaped ear's cover, specifically without a 15 sponge part. In the interior of that cover, the anti-noise is produced, or is sent thereto. If the cover is fully closed, the noise a such is not as loud as without the headset, and thus, the anti-noise might be made less strong. The cover may have other shapes and may be partly open.

Figure 9C:
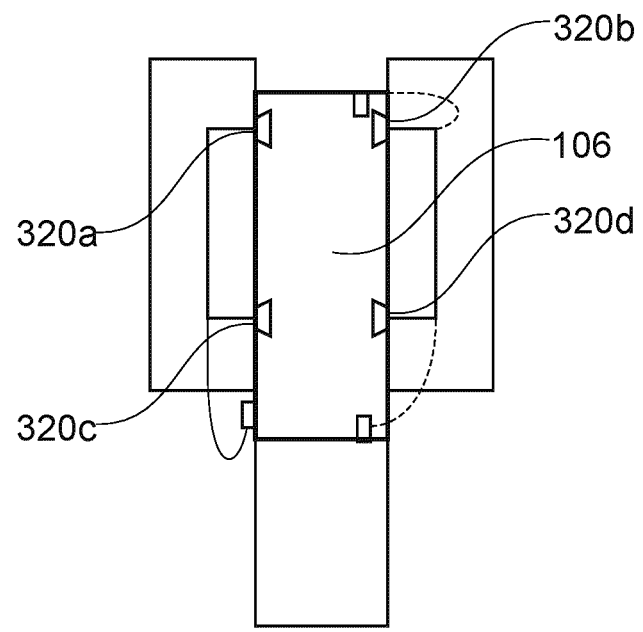
FIG. 9c shows an arrangement of multiple loudspeakers in the bore of a magnetic resonance imaging system in a top sectional view.
Figure 9D:
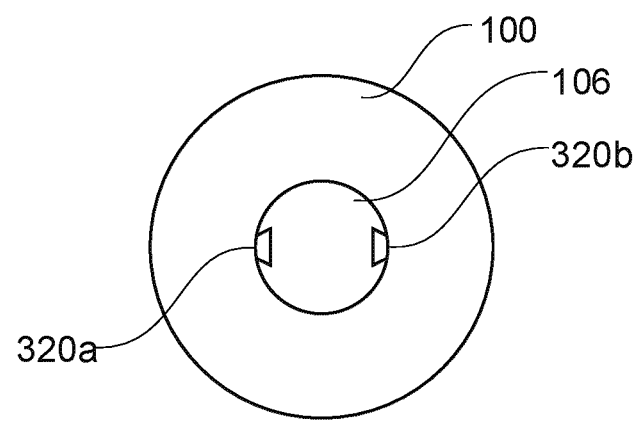
FIG. 9d shows the arrangement of FIG. 9c in a lateral view.

FIG. 9c and FIG. 9d show another example setup to play anti-noise inside the bore 106 of the magnet. One or more loudspeakers 320a, 320b, 320c and 320d may in this embodiment be placed permanently inside the magnetic resonance imaging system 100 in strategically selected places and anti-noise is played from the speakers to cancel the actual noise. This may avoid a need for headphones on the patients.

Figure 10A:
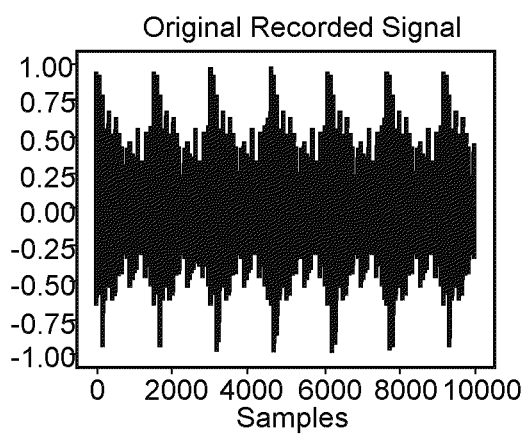
FIG. 10a to 10d show noise patterns of real and synthesized noise and their respective frequency composition.
Figure 10B:
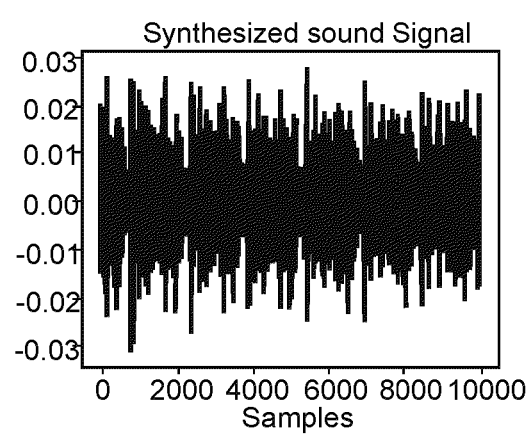
Figure 10C:
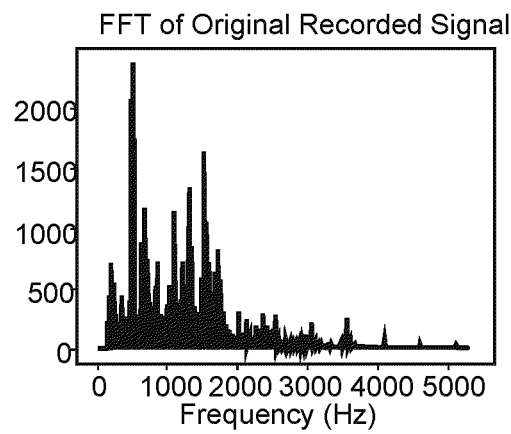
Figure 10D:
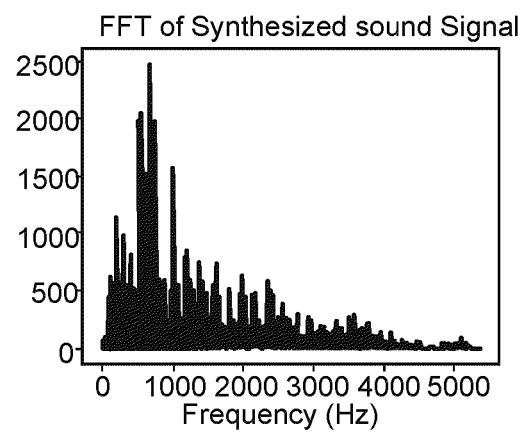

FIG. 10a shows the noise pattern of real noise and FIG. 10 b a noise pattern of respective synthesized (predicted) noise, when an embodiment of the method was used. FIG. 10c shows the respective frequency composition in the noise pattern of FIG. 10a, and FIG. 10d shows the respective frequency composition in the noise pattern of FIG. 10b. The frequency composition has been obtained by Fast Fourier Transformation, FFT. From a comparison, one can see that the embodiment is quite good at predicting the real noise, thereby enabling to generate a suitable anti-noise, to the comfort of the subject in the bore 106.

Examples may possibly comprise one or more of the following features:

A system (signaling system 122) for machine learning, trained or to be trained.

A system for presenting the ant-noise to the subject, for instance a loudspeaker, headphones, a headset, or earphones with a shielding against the magnetic fields in the magnetic resonance imaging system.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 magnetic resonance imaging system
102 magnet
106 bore of magnet
108 imaging zone
109 region of interest
110 magnetic field gradient coils
112 magnetic field gradient coil power supply
114 radio-frequency coil
118 subject
120 subject support
122 machine learning system
123 audio encoder unit
124 sound transducer
125 regression network unit
126 computer system
127 interaction unit
128 hardware interface
129 headphones
130 processor
131 clock
132 user interface
134 computer memory
140 machine executable instructions
142 multiple preparatory scan commands
144 selected preparatory scan commands
146 configuration data
148 pulse sequence commands
150 imaging k-space data
152 magnetic resonance imaging data
154 gradient coil pulse commands
156 gradient pulse starting time
158 predetermined time
160 selected (first) gradient coil pulse commands
162 stored constant values
164 selectable values
166 selected values
168 input values
170 earplug
172 External Noise
174 inverted wave as anti-noise signal
176 cancelled noise signal
180 microphone
182 Headphone 184 input to regression network unit 125
186 output of regression network unit 125
188 recording sound signal
190 short-term Fourier Transform
192 input to auto-encoder unit 123
194 encoder
195 bottleneck
196 decoder
197 result of training
198 output of Auto-encoder network unit 123
199 noise compensation stage
200 receive training data set at machine learning system
202 train machine learning system
204 receive selection input as to gradient coil pulse commands
206 provide the selected gradient coil pulse commands and at least one further value to machine learning system
208 receive from the machine learning system information as to anti-noise
210 control the magnetic resonance imaging system with the selected gradient coil pulse commands
212 operate sound transducer using the information received in step 208
214 synchronize steps 210 and 212
300 headset
302 clip
304 earpiece
310 headset
314 clip
316 sponge
318 outlet
320*a-d* loudspeakers

The invention claimed is:

1. A method of generating anti-noise in a first magnetic resonance imaging system comprising a bore for receiving a subject to be imaged, wherein the first magnetic resonance imaging system is configured for acquiring imaging k-space data from an imaging zone defined in the bore, wherein the first magnetic resonance imaging system comprises a magnetic field gradient coil system configured for generating magnetic gradient fields within the imaging zone and a memory containing pulse sequence commands configured for controlling the first magnetic resonance imaging system to acquire the imaging k-space data according to a magnetic resonance imaging protocol, wherein the memory further comprises gradient coil pulse commands configured for controlling the magnetic field gradient coil system during the acquisition of the imaging k-space data;

wherein the method comprises:
receiving a selection input for selecting, out of the gradient coil pulse commands, a first set of gradient coil pulse commands,
providing the selected gradient coil pulse commands and at least one value relating to a respective at least one further parameter describing an imaging of the subject to a trained machine learning system,
in response to the providing, receiving from the machine learning system information as to anti-noise to be generated by a sound transducer to compensate for noise experienced at the subject's ears and resulting from operation of the magnetic resonance imaging system with the first set of gradient coil pulse commands and under the constraints of the at least one value,
wherein the machine learning model is trained using the training sets of gradient coil pulse commands and the training values as input and the noise as output,
controlling the first magnetic resonance imaging system with the pulse sequence commands and the first set of gradient coil pulse commands for acquisition of the imaging k-space data;
operating the sound transducer for generating anti-noise using the information as output by the trained machine learning system synchronized with the controlling of the magnetic field gradient coil system with the selected gradient coil pulse commands.

2. A magnetic resonance imaging system configured for acquiring imaging k-space data from an imaging zone in a bore of the magnetic resonance imaging system for receiving a subject to be imaged, wherein the magnetic resonance imaging system comprises:
a magnetic field gradient coil system configured for generating magnetic gradient fields within the imaging zone;
a memory containing pulse sequence commands configured for controlling the first magnetic resonance imaging system to acquire the imaging k-space data according to a magnetic resonance imaging protocol, wherein the memory further comprises gradient coil pulse commands configured for controlling the magnetic field gradient coil system during the acquisition of the imaging k-space data; and wherein the memory contains machine executable instructions;
at least one sound transducer configured for outputting anti-noise;
a processor configured for controlling the magnetic resonance imaging system, wherein execution of the machine executable instructions causes the processor to control the magnetic resonance imaging system to:
receive a selection input for selecting, out of the gradient coil pulse commands, a first set of gradient coil pulse commands,
provide the selected gradient coil pulse commands and at least one value relating to a respective at least one further parameter describing an imaging of the subject to a trained machine learning system, wherein the machine learning model is trained using the training sets of gradient coil pulse commands and the training values as input and the noise as output,
in response to the providing, receive from the machine learning system information as to anti-noise to be generated by a sound transducer to compensate for noise experienced at the subject's ears and resulting from operation of the magnetic resonance imaging system with the first set of gradient coil pulse commands and under the constraints of the at least one value,
control the first magnetic resonance imaging system with the pulse sequence commands and the first set of gradient coil pulse commands for acquisition of the imaging k-space data;
operate the sound transducer for generating anti-noise using the information as output by the trained machine learning system synchronized with the controlling of the magnetic field gradient coil system with the selected gradient coil pulse commands.

3. A medical system, wherein the medical system comprises:
a memory storing machine executable intructions;
a processor configured for controlling the medical system, wherein execution of the machine executable instructions causes the processor to control the medical system to provide a trained machine learning module trained to output, for a magnetic resonance imaging system, information as to anti-noise to be generated by a sound transducer of the magnetic resonance imaging system in response to an input of selected gradient coil pulse commands for said magnetic resonance imaging system and at least one value relating to a respective at least one further parameter describing an imaging of a training subject with noise experienced at the training subject in the magnetic resonance imaging system; wherein the providing of the trained machine learning module comprises:

providing a machine learning model;

providing training data comprising associations of training sets of gradient coil pulse commands and training values relating to parameters describing an imaging of a training subject with noise experienced at the training subject and generated over time when operating of a training magnetic resonance imaging system with the training sets of gradient coil pulse commands and under the constraints of the training values;

training the machine learning model using the training sets of gradient coil pulse commands and the training values as input and the noise as output, the training resulting in the trained machine learning system.

4. A computer program comprising machine executable instructions stored on a non-transitory computer readable medium configured to control a magnetic resonance imaging system to acquire imaging k-space data from an imaging zone, wherein the magnetic resonance imaging system comprises a magnetic field gradient coil system configured for generating magnetic gradient fields within the imaging zone, a memory containing pulse sequence commands configured for controlling the first magnetic resonance imaging system to acquire the imaging k-space data according to a magnetic resonance imaging protocol, wherein the memory further comprises gradient coil pulse commands configured for controlling the magnetic field gradient coil system during the acquisition of the imaging k-space data, wherein execution of the machine executable instructions causes the processor to control the magnetic resonance imaging system to:

receive a selection input for selecting, out of the gradient coil pulse commands, a first set of gradient coil pulse commands, provide the selected gradient coil pulse commands and at least one relating to a respective at least one further parameter describing an imaging of the subject to a machine learning system,, in response to the providing, receive from the machine learning system information as to anti-noise to be generated by a sound transducer to compensate for noise experienced at the subject's ears and resulting from operation of the magnetic resonance imaging system with the first set of gradient coil pulse commands and under the constraints of the at least one value, wherein the machine learning model is trained using the training sets of gradient coil pulse commands and the training values as input and the noise as output, control the first magnetic resonance imaging system with the pulse sequence commands and the first set of gradient coil pulse commands for acquisition of the imaging k-space data;

operate the sound transducer for generating anti-noise using the information as output by the trained machine learning system synchronized with the controlling of the magnetic field gradient coil system with the selected gradient coil pulse commands.

5. The method of claim 1, wherein the at least one further parameter comprises at least one parameter out of the group comprising:

a parameter defining the field strength Bo of the static main magnetic field of the first magnetic resonance imaging system;

one or more parameters defining the magnetic field gradient general configuration;

one or more parameters indicating scan commands in the memory to be used for acquiring the k-space data;

one or more parameters indicating a relative orientation of the subject to the bore;

one or more parameters defining a physical shape of the subject.

6. The method of claim 1, the method comprising receiving the at least one further parameter via an input device of the magnetic resonance imaging system.

7. The method of claim 1, the sound transducer comprising anyone of a loudspeaker in the inside of the bore of the first magnetic resonance imaging system, earphones to be worn by the subject, a headset to be worn by the subject, and headphones to be worn by the subject.

8. The method of claim 1, further comprising providing the trained machine learning system comprising:

a) receiving a training data set comprising associations of training sets of gradient coil pulse commands and training values relating to parameters describing an imaging of a training subject with noise experienced at the training subject's ears and generated over time when operating of a training magnetic resonance imaging system with the training sets of gradient coil pulse commands and under the constraints of the training values, b) training a machine learning model using the training sets of gradient coil pulse commands and the training values as input and the noise as output, the training resulting in the trained machine learning system.

9. The magnetic resonance imaging system of claim 2, wherein at least one value of the at least one value refers to preparatory scan commands.

10. The magnetic resonance imaging system of claim 2, wherein execution of the machine executable instructions causes the processor to reconstruct magnetic resonance imaging data from the imaging k-space data.

11. The magnetic resonance imaging system of claim 2, wherein the trained machine learning system is implemented by a neural network that is part of the magnetic resonance imaging system.

12. The magnetic resonance imaging system of claim 2, wherein the magnetic resonance imaging system is configured to be coupled to a neural network that implements the trained machine learning system.

13. The method of claim 5, wherein the at least one further parameter includes all of the parameters out of the group.

14. The method of claim 8, wherein the parameters to which the training values relate comprise at least one parameter out of the group comprising:

a parameter defining the field strength Bo of the static main magnetic field of the training magnetic resonance imaging system;

one or more parameters defining the magnetic field gradient general configuration of the training magnetic resonance imaging system;

one or more parameters indicating scan commands in the memory to be used for acquiring the k-space data;

one or more parameters indicating a relative orientation of the training subject to the bore;

one or more parameters defining a physical shape of the training subject.

15. The method of claim 8, wherein anyone of the following:

the training magnetic resonance imaging system is a simulated magnetic resonance imaging system and the noise is simulated noise of the simulated magnetic resonance imaging system, the training magnetic resonance system corresponds to the first magnetic resonance system, the training magnetic resonance imaging system is a second magnetic resonance imaging system and the noise is measured noise of the second magnetic resonance imaging system.

* * * * *